United States Patent [19]

Walker

[11] 3,919,697

[45] Nov. 11, 1975

[54] DATA RECORD TRACKING USING TRACK IDENTIFYING INFORMATION IN THE GAPS BETWEEN RECORDED DATA GROUPS

[75] Inventor: Ray A. Walker, Kennewick, Wash.

[73] Assignee: The Battelle Development Corporation, Columbus, Ohio

[22] Filed: June 26, 1974

[21] Appl. No.: 483,131

[52] U.S. Cl.......... 340/173 R; 340/173 LM; 360/77; 360/78

[51] Int. Cl.[2]..................... G11B 21/10; G11B 17/00

[58] Field of Search... 340/173 LT, 173 LM, 173 R; 360/77, 78; 178/6.6 R, 6.7 A; 250/202; 179/100.3 V

[56] References Cited

UNITED STATES PATENTS

| | | | |
|---|---|---|---|
| 3,426,337 | 2/1969 | Black et al. | 360/77 |
| 3,530,258 | 9/1970 | Gregg et al. | 179/100.3 V |
| 3,593,331 | 7/1971 | Connell et al. | 360/77 |
| 3,691,543 | 9/1972 | Mueller | 360/77 |
| 3,789,372 | 1/1974 | Lejon | 340/173 LT |

OTHER PUBLICATIONS

Aitcheson et al., Message Store, A Disk Memory System, Bell System Tech. J., Vol. 49, No. 10, 12/70, pp. 2887–2913, S 1440 0009.

*Primary Examiner*—Stuart N. Hecker
*Attorney, Agent, or Firm*—Klarquist, Sparkman, Campbell Leigh, Hall & Whinston

[57] ABSTRACT

A technique for tracking lines of recorded analog or digital data and records which can be played back using such tracking, are described in which tracking information is recorded in the gaps between groups of data on such records at positions spaced along the entire length of each track line to enable the track lines to be scanned one line at a time during readout. The tracking information includes recorded track identifying information which is distinguishable from the recorded data and which identifies a given track line from the two adjacent lines on opposite sides thereof. A time related sampling type of tracking method is described by which a light beam or other sensing means is scanned along the track lines, one line at a time, to produce an electrical readout signal corresponding to the digital data and tracking information being scanned. First and second sample signals are stored and compared to produce a correction signal corresponding to the difference between sample signals, and the correction signal is applied to a tracking means for moving the sensing means toward the center of the line being scanned by an amount proportional to the correction signal.

21 Claims, 10 Drawing Figures

TRACK C SIGNAL OFF CENTER TOWARD TRACK B

DATA RECORD TRACKING USING TRACK IDENTIFYING INFORMATION IN THE GAPS BETWEEN RECORDED DATA GROUPS

BACKGROUND OF THE INVENTION

The subject matter of the present invention relates generally to the playback tracking of data records having analog or digital data recorded thereon in spaced data groups on a plurality of adjacent track lines so that such lines may be scanned one line at a time. By providing tracking information on such lines in the gaps between the data groups at positions spaced along the entire length of each track line, the track lines may be scanned one line at a time without accidentally straying from the scanned line to another track line, even when the track lines are closely spaced together for high density storage of data.

The tracking information includes track identifying zones which are provided on the track lines so that the recorded track identifying zone on the scanned line is longitudinally spaced from the recorded identifying zones in the two lines on opposite sides thereof. The recorded track identifying information is distinguishable from the recorded digital data, such as by using recorded spots of different size or by selectively increasing the gain of the sensing means when the tracking information is scanned. As a result, in the preferred embodiment of the tracking method of the present invention, the electrical readout signal of the sensing means scanned along the line is sampled at least twice at times corresponding to the track identifying zones of the two lines on opposite sides of the scanned line to provide sample signals of any error signal portions in the readout signal. These sample signals are compared to produce a correction signal which is applied to the tracking means to cause the sensing means to be moved back toward the center of the scanned track line.

The present invention is an improvement on the tracking methods disclosed in U.S. Pat. Nos. 3,501,586 and 3,624,284 of J. T. Russell, granted Mar. 17, 1970, and Nov. 30, 1971. In these previous patents, the track lines of digital data are not provided with track identifying information, but tracking is accomplished by "dithering" the light beam back and forth across the track during scanning or by providing a pair of light detectors on opposite sides of the scanned track whose outputs are connected to a differential amplifier, in order to produce the tracking correction signal. The tracking technique of the present invention simplifies the tracking method and apparatus, and enables the track lines to be positioned closer together.

It is known to provide track address information at the start of a track to enable random access of a magnetic memory disc having digital data recorded thereon, as shown in U.S. Pat. No. 3,085,230 of Shoultes et al., granted Apr. 9, 1963. However, track identifying information is not provided in the gaps between digital data groups at positions spaced along the entire length of the track line in order to maintain a sensing means on the center of the track line during scanning in the manner of the tracking technique of the present invention. Instead, the patent merely discloses a method of verifying that the proper track line has been reached by the access arms carrying the read-write transducers, by comparing the desired track address stored in the control logic of the access arm with the track address at the start of the track line. If the two track addresses match, scanning of the track begins and track centering is apparently accomplished mechanically in a conventional manner. Thus, there is no automatic track centering using track identifying information recorded at positions spaced along the entire length of the track line in the manner of the present invention.

Previous digital tracking methods rely on sensing the amplitude of the readout signal to determine whether the sensor means is scanning the track properly, and such amplitude related tracking methods are complicated by their inability to directly determine the direction of any correctional control which may be needed to bring the sensing means back to the center of the track. The tracking technique of the present invention overcomes this disadvantage by employing a time related method to determine whether the sensing means is straying toward the adjacent track lines above or below the scanned line by sampling the readout signal at times corresponding to the track identifying information in such adjacent lines. It should be noted that with the tracking method of the present invention, the sensing means never completely leaves the track lines being scanned, but does overlap with the recorded track identifying information on adjacent track lines which immediately causes the sensing means to return to the center of the scanned track.

SUMMARY OF THE INVENTION

One object of the present invention is to provide an improved tracking method for scanning recorded lines of analog or digital data and records suitable for use with such method which enables readout of data stored at extremely high density on such record.

Another object of the invention is to provide such a data record and tracking method in which the tracking information is recorded on the track lines in the gaps between data groups at positions spaced along the lengths of such lines to enable tracking in a simple, efficient manner.

A further object of the present invention is to provide such a data record and tracking method which operates in a time related manner by using track identifying information recorded at laterally spaced positions on adjacent track lines to determine when a scanned sensing means tends to stray off of the track line being scanned and for making necessary tracking corrections to maintain such sensing means on the center of the scanned line.

Still another object of the present invention is to provide such a data record and tracking method in which the readout signal produced by the sensing means is sampled to produce two sample signals at two different times corresponding to tracking information recorded in the two immediately adjacent lines on opposite sides of the scanned line, and comparing the two samples to produce a correction signal which is employed to cause a tracking means to move the sensing means back toward the center of the scanned line.

A still further object of the present invention is to provide such an improved data record and tracking means suitable for use on optical records of digital data in which the tracking information is distinguishable from the digital data as recorded, such as by using spots of different size.

DESCRIPTION OF PREFERRED EMBODIMENTS

Figures 1, 2, 3:
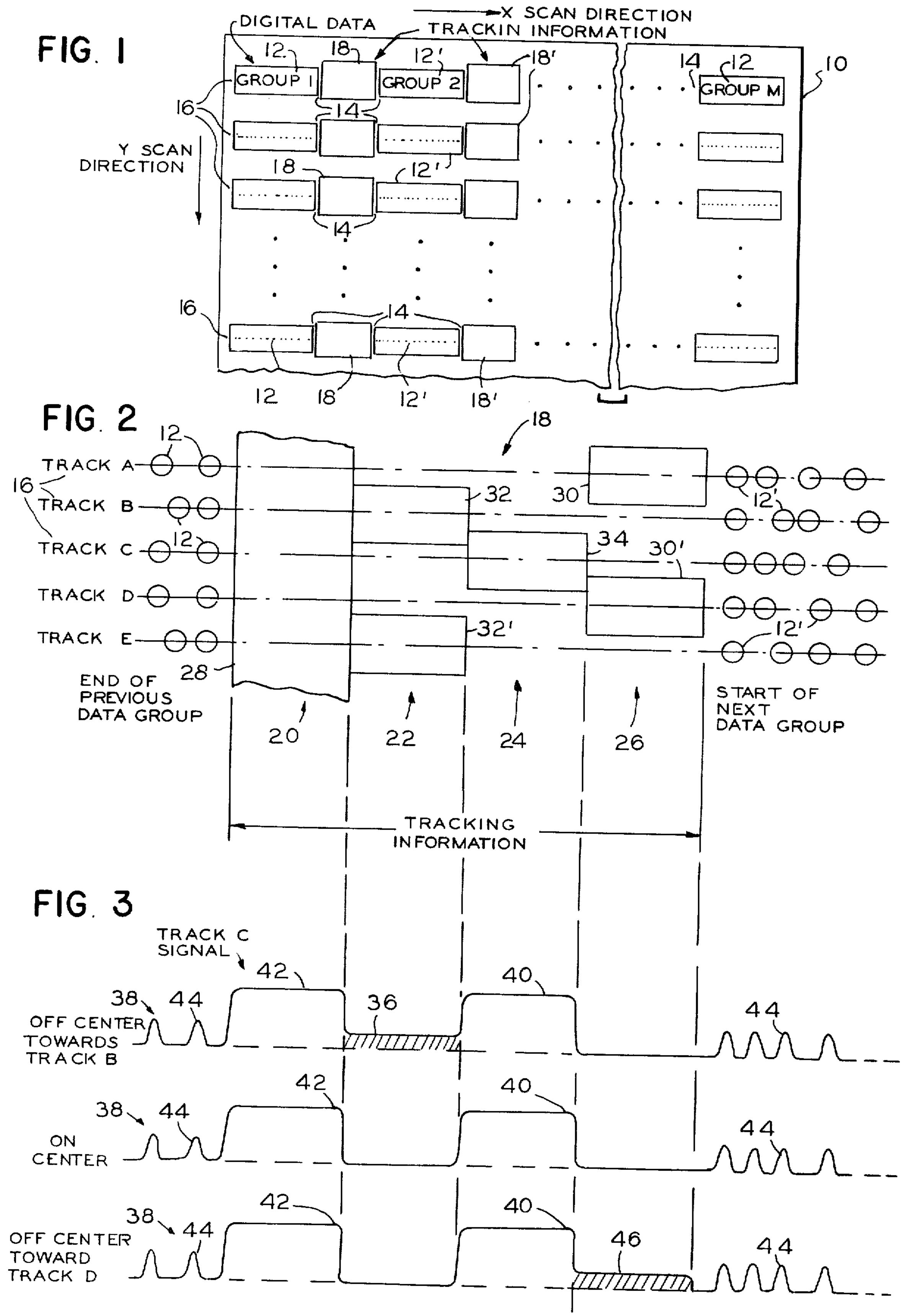
FIG. 1 is a plan view of a part of a digital record made in accordance with one embodiment of the present invention schematically showing the digital data and tracking information recorded thereon.
FIG. 2 is an enlarged view of a portion of the record element of FIG. 1.
FIG. 3 is a schematic view of the waveforms of electrical readout signals produced by a sensor means scanned along track line "C" in FIG. 2, under different conditions.

As shown in FIG. 1, a digital record element 10, made in accordance with one embodiment of the present invention, includes digital data groups or "records" 12 recorded in lines so that such data groups are spaced apart by gaps 14. The digital record may be an optical record of digital data formed by binary coded spots of light opaque, or light reflecting material mixed with transparent spaces to provide "0" and "1" bits which may be recorded photographically, as disclosed in U.S. Pat. No. 3,501,586 of Russell. However, it is also possible for the digital data to be provided on magnetic tapes or discs as well as on capacitance type records formed by a plurality of spaced metalized spots on a suitable insulating support member. The digital data groups 12 are recorded in a plurality of track lines 16 which may be separate parallel tracks or may be part of a single series track of the spiral or raster types shown in U.S. Pat. No. 3,501,586. In accordance with the present invention, tracking information regions 18 are provided in the gaps 14 between the data groups 12 at positions spaced along the entire length of the track lines. Preferably, the gaps 14 are arranged in several groups of vertically aligned gaps so that the corresponding data groups of adjacent lines start and stop at the same time. The tracking information enables a light beam or other sensing means to scan the track lines one line at a time and to prevent such sensing means from straying from the scanned line to the immediately adjacent lines on opposite sides thereof.

As shown in FIG. 2, in one embodiment of the digital record, the tracking information regions 18 are each provided with a reference time zone 20 at the beginning of such regions and at least three track identifying zones 22, 24 and 26, which are longitudinally displaced with respect to each other and with respect to the reference time zone. The reference time zone 20 in each tracking information region 18 is provided with a recorded time reference "spot" in the form of a vertical band 28. The reference band 28 extends through all of the vertically aligned gaps 14 in one group of vertically aligned gaps in FIG. 1, and similar reference bands are provided in the other groups of vertically aligned gaps. However, the track identifying zones 22, 24 and 26 are selectively recorded with track identifying spots in a coded manner. Thus, for track line "A", an identifying spot 30 is recorded in zone 26, for track line "B" an identifying spot 32 is recorded in zone 22, and for track line C an identifying spot 34 is recorded in zone 24. The code repeats every fourth line so that track line "D" is provided with an identifying spot 30' in zone 26, and track line "E" is provided with an identifying spot 32' in zone 22.

The identifying spots 30, 32 and 34 may be rectangular shaped spots, while the digital data spots 12 may be circular spots of smaller size than such identifying spots, as shown in FIG. 2. However, the track identifying spots may be of the same size and shape as the data spots, and distinguishable therefrom in other ways such as by being of a different color or different light transmitting and/or reflecting property. In the preferred embodiment for optical records, the track identifying spots 30, 32 and 34 are of a greater height than the data spots 12 and also are of a greater width than such data spots to enable them to be easily distinguished for tracking purposes. Also, as shown in FIG. 2, track identifying spots 30 and 32 partially overlap in height so that a sensing means, such as a light beam, scanning longitudinally along tracks A or B can pass simultaneously across both of the identifying spots. Similarly, track identifying spot 34 partially overlaps both spot 32 and spot 30', while spot 32' partially overlaps spot 30'. Thus, the identifying spots partially "overlap" in a vertical direction insofar as the longitudinal scanning means is concerned, even though they are not superimposed over each other.

During tracking a light beam or other sensing means of about the same diameter as data spot 12 is scanned along the track lines. When the sensing means is scanning along track C, such sensing means will only sense identifying spots 34 and produce the middle readout signal 38 in FIG. 3 if it is centered on track C. However, if the sensing means drifts upward from the center line of track C, it will sense the lower portion of identifying spot 32 in track B and produce an error signal portion 36 in the upper readout signal 38 of the sensor. In both cases, the sensing means crosses identifying spot 34 to produce pulse 40 and crosses the reference band 28 to produce pulse 42 in such readout signal. The sensing means produces smaller pulses 44 in the readout signal each time it crosses one of the digital data spots 12 in track line C. Of course, data pulses 44 contain the digital data information, while the reference pulse 42 and track identifying pulses 36 and 40 contain the tracking information. As shown in FIG. 3, when the sensing means strays downward from the center of track C, it senses a top portion of the identifying spot 30' to produce error signal portion 46 immediately after the track identifying pulse 40 in the lower readout signal. It should be noted that the two error signals, 36 and 40, are longitudinally displaced in time with respect to the time reference pulse 42 which may be used to trigger a sampling of these two error signals. Thus, by suitably sampling the readout signal 38 at times corresponding to the identifying zones 22 and 26 during scanning of track line C, it can be determined from the presence or absense of error signals 36 and 46, whether the sensing means is on the center of track C, or has strayed upward or downward from such center. An appropriate correction, corresponding in amount and polarity to the relative difference between the two samples, can be made to move the sensing means back to the center of track C.

Figure 6:
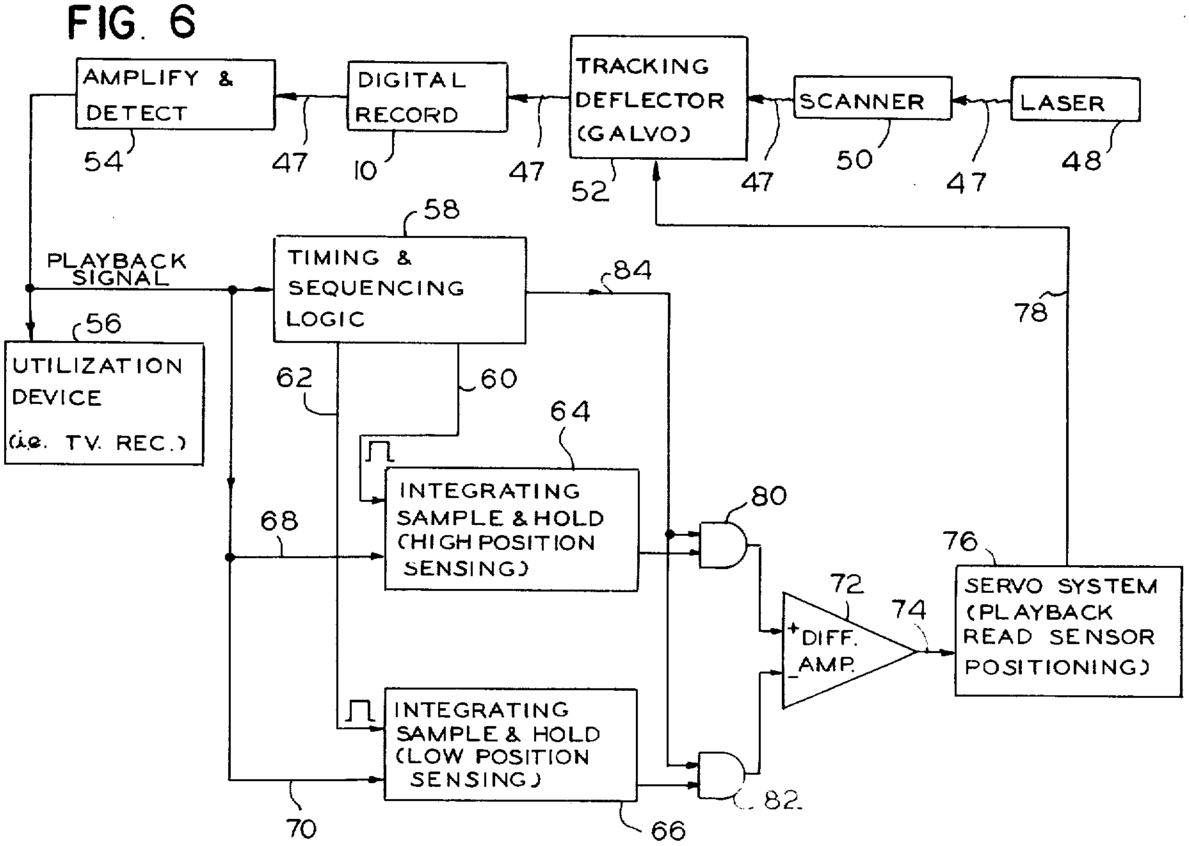
FIG. 6 is a schematic diagram of a tracking system which may be used to carry out one embodiment of the tracking method of the present invention.

One tracking system, suitable for accomplishing this time related sampling used in a preferred embodiment of the tracking method of the present invention, is shown in FIG. 6. When an optical digital record 10 is used, a light beam 47 is used as the sensing means. The light beam is preferably provided by a laser 48 that transmits such light beam to a scanner means 50 which scans the light beam longitudinally along the track lines 16 on record 10. The scanner may be a rotating mirror of the type shown in previously discussed U.S. Pat. No. 3,501,586, or it may be a rotating support plate of light opaque material having objective lenses mounted thereon so that the light emitted by the laser is only transmitted through one of such lenses at a time to the record. Of course, such a scanner would produce arcuate tracks rather than linear tracks and the track lines would be modified accordingly from that shown in FIG. 1. The light beam 47 is also transmitted through a tracking deflector 52 before striking the digital record 10. The tracking deflector may be a mirror mounted on a galvanometer and deflects the light beam laterally from one track line to another during scanning. The tracking deflector 52 also serves to correct any tracking errors by slightly deflecting the beam back toward the center of the scanned track in accordance with the method of the present invention in a manner hereafter described.

After the light beam senses the digital data 12 and tracking information 18 provided on a track line, it is transmitted to a photoelectric detector and associated amplifier circuit 54. The detector converts the light signal into an electrical signal corresponding to the readout signal 38 of FIG. 3 and transmits such readout signal through an amplifier to a suitable utilization device 56. The utilization device may be a television receiver, when the digital information recorded on record 10 is a video television signal. A portion of the readout signal, which of course is the playback signal of the record 10, is transmitted to a timing and sequencing logic circuit 58 to trigger such circuit and cause it to produce gating pulses on outputs 60 and 62 which are applied to first and second sampling circuits 64 and 66, respectively. The readout signal is also transmitted from the detector and amplifier 54 to the inputs 68 and 70 of sampling circuits 64 and 66 for sampling such readout signal.

The sampling circuits 64 and 66 are of a conventional type which include a memory, such as that shown in U.S. Pat. No. 3,248,655 of Kobbe et al, granted Nov. 30, 1971. Thus, the sampling circuits 64 and 66 sample and transmit only two narrow sample portions of the readout signal applied to their inputs 68 and 70, such samples being taken during the time gating pulses are applied by the logic circuit 58 to gating inputs 60 and 62. In the embodiment of FIGS. 2 and 3, the logic circuit 58 is triggered by the trailing edge of the reference pulse 42, and when track C is being scanned such logic circuit then produces a gating pulse on terminal 60 during the track identifying zone 22 for sampling error signal 36, and later produces a gating pulse on terminal 62 during track identifying zone 26 for sampling error signal 46. It should be noted that the relative amplitude of the error signals 36 and 46 is determined by the distance of the light beam or other sensing means from the center line of track C in FIG. 2. In other words, the further the light beam is from the center line of track C, the higher the amplitude of one error signal will be relative to the other error signal.

Each of the sampling circuits 64 and 66 contains a suitable memory including a storage capacitor which stores the sample taken of the readout signal. The memories may be staircase type memories of the type shown in U.S. Pat. No. 3,248,655 which integrate a plurality of successive samples by adding or subtracting the voltage of each sample from the total voltage of prior samples stored on the memory capacitor.

The sampling outputs of the sampling and memory circuits 64 and 66 are transmitted to a suitable comparator, such as a difference amplifier 72, which compares such outputs and produces a correction signal at its output 74 whose amplitude and polarity correspond to the difference between the two sample outputs. It should be noted that the polarity of the correction signal at output 74 will depend upon which of the two sample outputs of the sampling circuits 64 and 66 is greater than the other. Thus, if the sample output of sampling circuit 64 is greater than the output of the sampling circuit 66, the correction signal will be positive, because circuit 64 is connected to the positive input of the difference amplifier 72, whereas such correction signal will be negative if the output signal of the sampling circuit 66 is greater than the output of sampler 64 because circuit 66 is connected to the negative input of such difference amplifier. In any event, the polarity and magnitude of the correction signal at output 74 is such as to cause a servo system 76 having its output 78 connected to the tracking deflector 52 to move the mirror of such deflector and deflect the light beam back toward the center of track C.

If the sampling circuits are of the integrating type, their outputs are gated, such as by transmitting their output signal through And-gates 80 and 82 to the difference amplifier 72. The other inputs of And-gates 80 and 82 are connected to a third gating output 84 of the timing and sequencing logic circuit 58. Thus, the gating output 84 of the sequencing logic circuit is only pulsed when it is desired to compare the sample outputs of the sampling circuits 64 and 66 in the difference amplifier after several samples have been taken. This may be done after a predetermined number of samples by a pulse counter provided in such logic circuit. Alternatively the gating output 84 could be produced by the sampling circuits when the total sample voltage stored in the memory capacitor of either circuit exceeds a predetermined amount.

It should be noted that when a different track line than track C is being scanned, the timing and sequencing logic circuit 58 will generate gating pulses on terminals 60 and 62 at different times including a pulse in track identifying zone 24 in order to sample any error signals occurring at those times. Thus, when track lines B or D are being scanned an error signal is produced during the time zone 24 if the light beam or other sensing means drifts off of the center of such track line. Finally, it should be noted in FIG. 2 that because of the overlap in height of the track identifying spots 30, 32 and 34 and the greater height of such identifying spots than the data spots 12, the light beam or other sensing means never completely leaves the track being scanned and never strikes the data spots of adjacent tracks. Of course if this were to happen, an error would appear in the readout signal before the tracking correction could be accomplished.

Figures 4, 5:
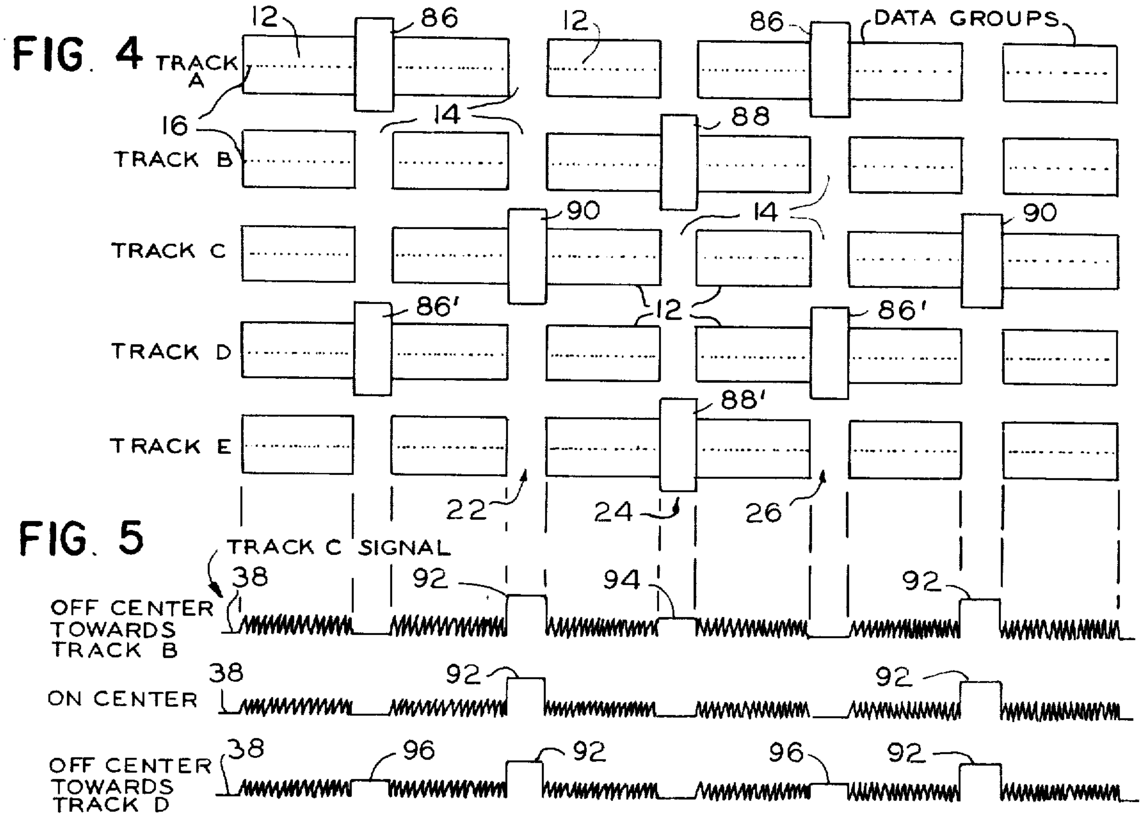
FIG. 4 is a plan view of a portion of a digital record made in accordance with another embodiment of the invention schematically showing the digital data groups as rectangles.
FIG. 5 is a schematic view of the waveforms of electrical readout signals produced by a sensor means scanned along track line C in FIG. 4, under different conditions.

Another embodiment of a digital record made in accordance with the present invention is shown in FIG. 4 and is similar in some respects to the embodiment of FIG. 2 as indicated by the same reference numbers. In FIG. 4, the gaps 14 between digital data groups 12 each serve as one of the track identifying zones 22, 24 and 26. Thus, in track line A, track identifying spots 86 are provided in the first gap and the fourth gap. Track identifying spot 86 corresponds to identifying spot 30 in FIG. 2. Similarly track B is provided with a track identifying spot 88 in the third gap, which corresponds to identifying spot 32 in FIG. 2. In a similar manner, track C is provided with an identifying spot 90 in the second gap and in the fifth gap, which corresponds to identifying spot 34 of FIG. 2. Track D is provided with identifying spot 86′ in the first gap and the fourth gap so that it is coded in a similar manner to track A. Finally, track E is provided with an identifying spot 88′ in the third gap so that it is coded in a similar manner to track B. As in FIG. 2, the identifying spots 86, 88 and 90 are of greater height than the data spots 12 and may overlap in height with the identifying spots of adjacent track lines. This prevents the sensing means from completely leaving the scanned track line or from sensing the data spots of adjacent track lines.

In FIG. 4, there is no separate time reference zone corresponding to zone 20 and reference band 28 of FIG. 2. Instead, the time reference is provided by the track identifying zone which occurs in the track being scanned. For example, when scanning track line C identifying spot 90 becomes the time reference spot and produces pulses 92 in each of the electrical readout signals 38 produced by a sensing means scanning along track C, as shown in FIG. 5. If the sensing means scanning track C drifts upward, it senses the bottom portion of the identifying spot 88 on track B and produces error signal 94 in the upper readout signal 38 of FIG. 5. Similarly if the sensing means scanning track C drifts downward, it will sense a top portion of the identifying spots 86′ in track D and thereby produce error signal pulses 96 in the lower readout signal of FIG. 5. Of course, if the sensing means remains centered on track C, no such error signals are produced, as shown by the intermediate readout signal 38 of FIG. 5. The readout signals of FIG. 5 would be produced at the output of the detector and amplifier circuit 54 in the tracking system of FIG. 6 and the pulses 92 would function as time reference pulses. Thus, the trailing edges of pulses 92 could be used to trigger the timing and sequence logic circuit 58 during the scanning of track line C to cause it to produce two gating pulses on its outputs 60 and 62 at times corresponding to track identifying zones 24 and 26, respectively, in order to sample error signals 94 and 96.

As noted previously with respect to FIG. 3, the amplitude of the error signals 94 and 96 which are sampled by the sampling circuits 64 and 66 vary depending upon the distance that the light beam or other sensing means has strayed from the center line of track C. This is true because the amount of the light beam which strikes the track identifying spots 88 and 86′ varies in accordance with the distance such light beam is from the center line of track C and therefore controls the amplitude of the electrical signal produced by the photoelectric detector in circuit 54. In view of the above, it should be clear that the digital record of FIG. 4 can be tracked by the tracking system of FIG. 6 in the same manner as previously described with respect to the digital record of FIG. 2.

Figures 7, 8, 9, 10:
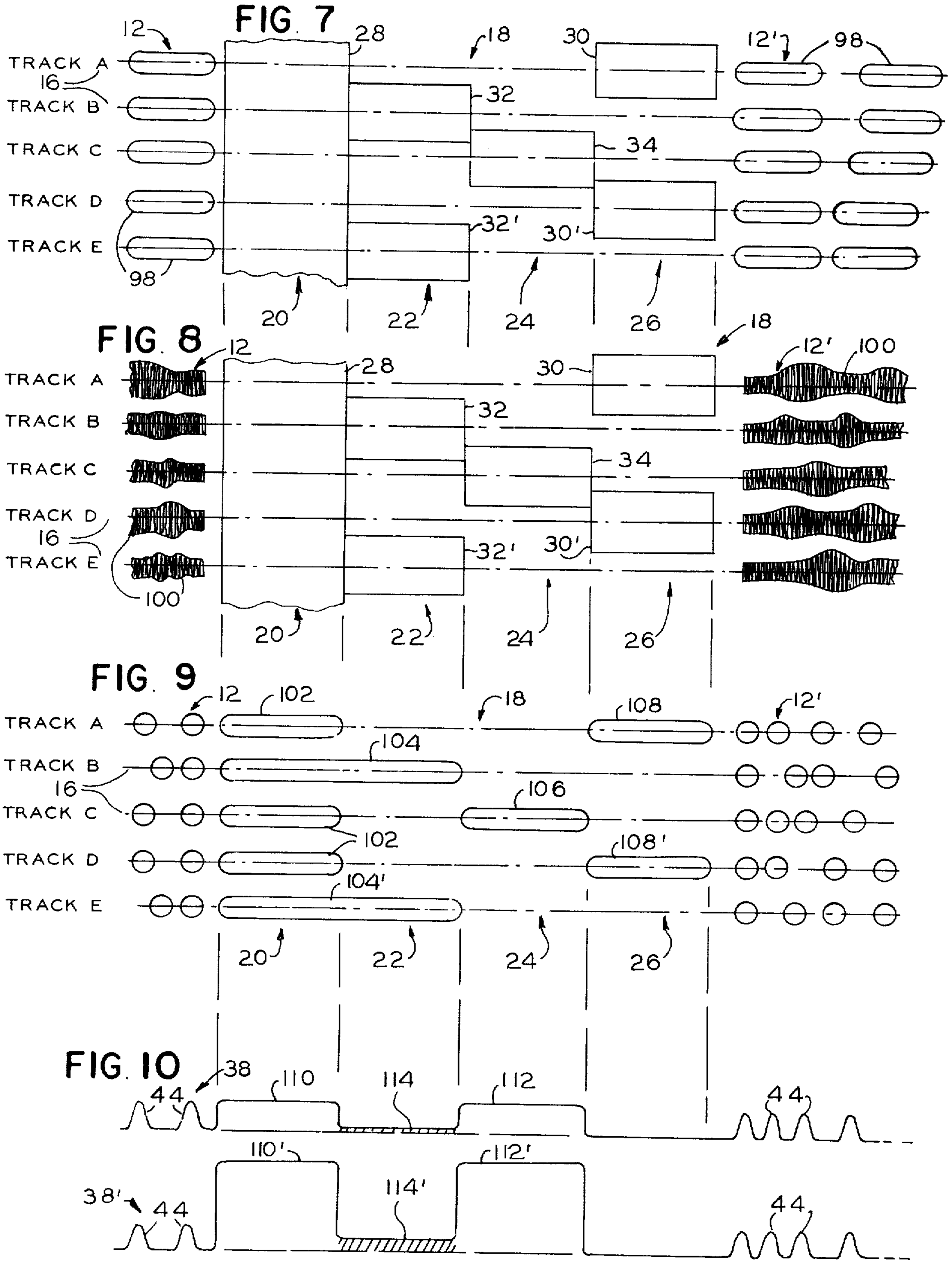
FIGS. 7 and 8 are enlarged views of portions of analog records having frequency or phase modulated data and amplitude modulated data, respectively, in accordance with other embodiments of the invention.
FIG. 9 is an enlarged view of a portion of still another embodiment of the data record in which the tracking information spots are of the same height as the data spots.
FIG. 10 is a schematic view of electrical readout signals produced by scanning track C of FIG. 9 before and after selectively amplifying the tracking information portion of the readout signal to distinguish it from the data portion of such signal.

While the preferred embodiment of the present invention relates to the tracking of digital data records, such invention can also be used to track analog records. As shown in FIG. 7, the analog data can be in the form of elongated data spots 98 which are of varying length or spacing to provide data groups 12 and 12′ of frequency or phase modulated data. The data groups 12 and 12′ are separated by the tracking information 18 and arranged in track lines 16 in a similar manner to FIG. 2. Thus, the frequency or phase of the data spots 98 is proportional or otherwise related to the data recorded.

Another embodiment of an analog data record in accordance with the invention is shown in FIG. 8 and includes amplitude modulated analog data 100 recorded in track lines 16. Thus, the data 100 could be recorded by amplitude modulating a light beam or magnetic signal in a conventional manner to provide data groups 12 and 12′ which are separated by tracking information 18 in a similar manner to FIG. 2.

As shown in FIG. 9 the tracking information 18 can be provided by tracking spots 102, 104, 106 and 108 of the same height as the digital data spots 12 and distinguished from such data spots by selective amplification of the tracking information signal portion in FIG. 10. Without this selective amplification the upper readout signal 38 produced by scanning track C in FIG. 9 with the sensing means formed by the light beam 47 and detector 54 of FIG. 6, includes tracking signal portions 110 and 112 corresponding to time reference spot 102 and track identifying spot 106 which are of the same amplitude as data signal portions 44. When the light beam scanning track C drifts upward, it strikes the lower portion of the spot 104 in the track identifying zone 22 and produces an error signal portion 114 in the upper readout signal 38. However the amplitude of the error signal 114 is very small because of the reduced height of the track identifying spot. As a result, such error signal may not produce a correction signal at the output of the comparator amplifier 72 of FIG. 6 which causes the light beam to return to the center of track C before it completely leaves such track. In order to correct this, the gain of the detector amplifier 54 is selectively increased only during the tracking information to amplify the tracking signal portions 110′, 112′ and error signal 114′ without amplifying the data signal 44 of the lower readout signal 38′.

It will be obvious to those skilled in the art that many changes may be made in the details of the above-described preferred embodiments of the present invention without departing from the spirit of the invention. For example, the track identifying spots may be in the form of predetermined patterns of binary bits, rather than merely single large rectangular spots. The same is true of the time reference zone. Also, as indicated the time reference zone 20 can be eliminated and the track identifying spots of the track line being scanned then used as the time reference. Alternatively, the time reference zone 20 can be left blank and the time reference signal set by the end of the previous data group. Of course, more than three track identifying zones can be employed with a corresponding change in coding. Therefore, the scope of the present invention should only be determined by the following claims.

I claim:

1. A method of playback tracking of a record of data recorded in spaced data groups on said record in a plurality of adjacent data track lines, comprising:

scanning a sensing means along the track lines of said record one line at a time to sense said data;

sensing tracking information recorded on said record in said data track lines at positions spaced along each line, said tracking information being provided in the gaps between data groups so that it is sensed at a different time than said data is sensed and said tracking information being distinguishable from said recorded data when scanned by said sensing means, said tracking information including track identifying information which is different for adjacent track lines;

detecting the output of the scanned sensing means to produce an electrical readout signal corresponding to the data and tracking information being scanned;

sampling said readout signal at least at times corresponding to the occurrence of track identifying information in the two lines on opposite sides of the one line being scanned and immediately adjacent thereto in order to provide first and second sample signals;

storing said first and second sample signals;

comparing the stored first and second sample signals to provide an electrical correction signal corresponding to the difference between said sample signals; and applying said correction signal to a tracking means for moving said sensing means toward the center of the line being scanned by an amount proportional to said correction signal.

2. A method in accordance with claim 1 in which the track identifying information is provided in time zones which for the scanned line and the two adjacent lines on opposite sides thereof are longitudinally displaced from each other, and during scanning the sensing means overlaps the scanned line and one of said two adjacent lines when said sensing means moves off the track of the scanned line.

3. A method in accordance with claim 1 in which the tracking information is of greater height than the recorded data to distinguish it from said data.

4. A method in accordance with claim 1 in which the output signal of the sensing means is selectively amplified so that the track information portion of the readout signal is amplified more than the data portion of said readout signal to distinguish said tracking information from the recorded data.

5. A method in accordance with claim 1 in which the record is an optical record, the sensing means includes a light beam which is scanned along the track lines, and the tracking means includes a light beam deflector means.

6. A method in accordance with claim 5 in which the track identifying information in the two lines of the record on opposite sides of the scanned line is longitudinally displaced from each other and from the track of identifying information in the scanned line so that the sampling occurs at two different times.

7. A method of playback tracking of a record of data recorded as spaced data groups in a plurality of adjacent data track lines on a record, comprising:

scanning a sensing means along the track lines of said record to sensing said data;

sensing tracking information recorded on said record in said data lines between data groups at different positions spaced along each line so that said tracking information is sensed at a different time than said data is sensed, said tracking information being distinguishable from said recorded data by said sensing means and including track identifying information which is different for adjacent track lines;

detecting the output of the scanned sensing means to produce an electrical readout signal corresponding to the data and tracking information being sensed;

producing a tracking correction signal from said readout signal; and applying said correction signal to a tracking means for moving said sensing means toward the center of the line being scanned by an amount proportional to said correction signal.

8. A data record comprising:

a record element;

data recorded in spaced data groups on said element in a plurality of adjacent data track lines; and tracking information for scanning along one track line at a time, recorded on said element in said data track lines so said tracking information is positioned in the gaps between said data groups and is distinguishable from said recorded data, said tracking information being recorded in a plurality of separate regions of tracking information at positions spaced along the entire length of each track and including track identifying information which distinguish a given track from the two adjacent tracks on opposite sides thereof.

9. A data record in accordance with claim 8 in which the recorded data is digital data.

10. A data record in accordance with claim 8 in which the recorded data is analog data.

11. A data record in accordance with claim 8 in which the recorded data is frequency or phase modulated data.

12. A data record in accordance with claim 8 in which the track identifying information is recorded in track identifying zones which are longitudinally displaced from the recorded track identifying zones of two other track lines on opposite sides of said one line, and said two other track lines have recorded track identifying zones longitudinally displaced from each other.

13. A data record in accordance with claim 12 in which at least some of the gaps are laterally aligned in groups and the track identifying zones for different lines are provided in different groups of aligned gaps.

14. A data record in accordance with claim 12 in which at least some of the gaps are laterally aligned in groups and the tracking information in an aligned group of gaps includes a reference time zone positioned prior to the track identifying zones in said gap to indicate the presence of tracking information.

15. A data record in accordance with claim 14 in which there are at least three track identifying zones per aligned groups of gaps, and track identifying information is recorded in only one of said identifying zones for each line.

16. A data record in accordance with claim 15 in which the corresponding zones of adjacent track lines are laterally aligned in the aligned gaps.

17. A data record in accordance with claim 15 in which the record element has digital data and tracking information recorded thereon as optical digital information.

18. A digital record in accordance with claim 17 in which the optical digital data is in the form of spots recorded in series on a single track including said track lines.

19. A digital record in accordance with claim 17 in which the optical digital data and tracking information is in the form of spots, and the data spots are of a different size than the tracking spots.

20. A digital record in accordance with claim 19 in which the tracking spots include track identifying spots that partially overlap in height with track identifying spots of adjacent lines on opposite sides thereof.

21. A digital record in accordance with claim 19 in which the tracking spots are of greater height than the data spots.

* * * * *

UNITED STATES PATENT AND TRADEMARK OFFICE

CERTIFICATE OF CORRECTION

PATENT NO. : 3,919,697

DATED : November 11, 1975

INVENTOR(S) : Ray A. Walker

It is certified that error appears in the above-identified patent and that said Letters Patent are hereby corrected as shown below:

Column 11, Claim 17, line 15, "15" should be --8--.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*